(12) United States Patent
Ciftcioglu et al.

(10) Patent No.: US 11,588,383 B2
(45) Date of Patent: Feb. 21, 2023

(54) STATOR WITH PINS AND AN INTERFACE FOR AN ELECTRICAL MACHINE

(71) Applicant: VALEO SIEMENS EAUTOMOTIVE GERMANY GMBH, Erlangen (DE)

(72) Inventors: Mert Ciftcioglu, Munich (DE); Dieter Sonnack, Hungen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 290 days.

(21) Appl. No.: 16/803,568

(22) Filed: Feb. 27, 2020

(65) Prior Publication Data

US 2020/0287447 A1 Sep. 10, 2020

(30) Foreign Application Priority Data

Mar. 5, 2019 (DE) .................... 10 2019 105 563.6

(51) Int. Cl.
*H02K 15/00* (2006.01)
*H02K 3/12* (2006.01)
*H02K 3/38* (2006.01)
*H02K 3/50* (2006.01)
*H02K 5/22* (2006.01)

(52) U.S. Cl.
CPC .......... *H02K 15/0081* (2013.01); *H02K 3/12* (2013.01); *H02K 3/38* (2013.01); *H02K 3/505* (2013.01); *H02K 5/225* (2013.01)

(58) Field of Classification Search
CPC ........ H02K 15/0081; H02K 3/12; H02K 3/38; H02K 3/505; H02K 5/225; H02K 3/28; H02K 2203/09; H02K 3/50; H02K 1/12; H02K 1/165
See application file for complete search history.

(56) References Cited

U.S. PATENT DOCUMENTS

| 2011/0012471 A1* | 1/2011 | Dang | ................. H02K 15/0421 |
| | | | 310/201 |
| 2018/0097416 A1* | 4/2018 | Dang | ...................... H02K 3/50 |
| 2018/0097417 A1 | 4/2018 | Dang | |
| 2019/0013704 A1 | 1/2019 | Pydin | |

FOREIGN PATENT DOCUMENTS

| DE | 19801596 A1 * | 7/1999 | .......... H01H 85/044 |
| DE | 10 2011 077 294 A1 | 12/2012 | |
| DE | 10 2016 221 043 A1 | 4/2018 | |
| EP | 2437378 A1 * | 4/2012 | ............... H02K 3/12 |

OTHER PUBLICATIONS

DE19801596A1Englishtranslation (Year: 2022).*
EP2437378Englishtranslation (Year: 2022).*

* cited by examiner

*Primary Examiner* — Tulsidas C Patel
*Assistant Examiner* — Viswanathan Subramanian
(74) *Attorney, Agent, or Firm* — Manabu Kanesaka (57) ABSTRACT

A stator (1) for an electric motor, including; a plurality of pins (11, 12, 13, 14, 21, 22, 23, 24, 31, 32, 33, 34) which are arranged on at least two concentric circles; and an interface (10, 20, 30) with at least one contact face (19, 29, 39), which is connected to two electrically conductive legs (10*a*, 10*b*, 20*a*, 20*b*, 30*a*, 30*b*) and is supported by the legs, wherein the legs are connected to at least one pin on different concentric circles.

8 Claims, 7 Drawing Sheets

STATOR WITH PINS AND AN INTERFACE FOR AN ELECTRICAL MACHINE

RELATED APPLICATIONS

The present application is based on, and claims priority from, German Application No. DE 10 2019 105 563.6 filed Mar. 5, 2019, the disclosure of which is hereby incorporated by reference herein in its entirety.

The invention relates to a stator with pins and an interface for an electrical machine, in particular an electric motor.

PRIOR ART

Electrical machines are known in general and, in the form of electric motors, are being used increasingly for the drive of vehicles. An electrical machine consists of a stator and a rotor.

The stator comprises a plurality of slots, in which the windings are guided. The windings may be formed from insulated copper bars in the form of what are known as pins. The rotor is situated in the stator and is connected to a rotor shaft.

Problem and Solution

The object of the present invention is to provide an interface at a stator with pins that is compact and robust.

In accordance with the invention the stator for an electrical machine comprises a plurality of pins, which are arranged on at least two concentric circles, and an interface having at least one contact face which is connected to two electrically conductive legs and is supported by the legs, wherein the legs are connected to at least one pin on different concentric circles.

By means of the legs on each side of the interface, the contact face is supported on the stator and thus makes it possible to provide a fixed point for connection of the phase conductors from an inverter.

In a further embodiment of the invention the pins are situated on a concentric circle in the inner region of the stator and on a concentric circle in the outer region of the stator.

As the interface is connected to pins on merely outer and inner concentric circles, the pins on concentric circles therebetween may be spanned by the interface.

One leg may preferably have a twist between the pin and the contact face.

As a result of the twist, the insulation distances between the leg and other pins are maintained without compromising the stability of the leg.

In one specific embodiment of the invention the twist may be both axially and radially to the stator.

The stability of the leg is further increased by this twist in two directions.

In a further embodiment of the invention the twist both axially and radially may be in a range of from 80 to 100 degrees, with respect to a starting position of the leg.

Both the insulation distances and the stability are sufficient in this range.

At least one leg may preferably be connected to at least two pins at an end remote from the interface.

In addition, with the connection of 2 pins, the interface may additionally be adapted in versatile fashion to different winding patterns.

The leg may further preferably be bent between the twist and the end remote from the interface at an angle of from 80 to 100 degrees, in particular at right angles.

As a result of the bend in the direction of the pins to be contacted, the leg may run above the pins not to be contacted, and in so doing may increase an insulation distance.

In a further embodiment of the invention, at the contact face the interface may have a recess for a contact pin or contact screw.

The interface may have an internal thread for a contact screw. This internal thread holds the contact screw and is supported on the stator by the legs. A stable connection between stator pins and inverter may thus be produced.

In a preferred embodiment the two legs may each be bent substantially at 90 degrees to one another, with the contact face situated in-between.

The interface with the contact face is situated between the two legs, which thus have a small overall height on the stator and at the same time hold the interface in sufficiently stable fashion above the stator.

The legs preferably may not protrude into an interior (( ) or into an exterior (A) of the stator (1).

The interior of the stator thus remains free for the rotor. In particular, there are no space conflicts between rotor and stator during the assembly of the rotor in the stator.

The exterior of the stator thus remains free for the housing. In particular during the assembly of the stator in the housing there are no space conflicts between the stator and the housing.

More preferably, a conductor may connect selected pins beneath the interface.

For example, the conductor connects coils to a common star point below the interface. A space-saving star point connection may thus be produced.

In accordance with the invention a vehicle (103) has an electrical machine with a stator according to one of the preferred embodiments.

Figure 1:
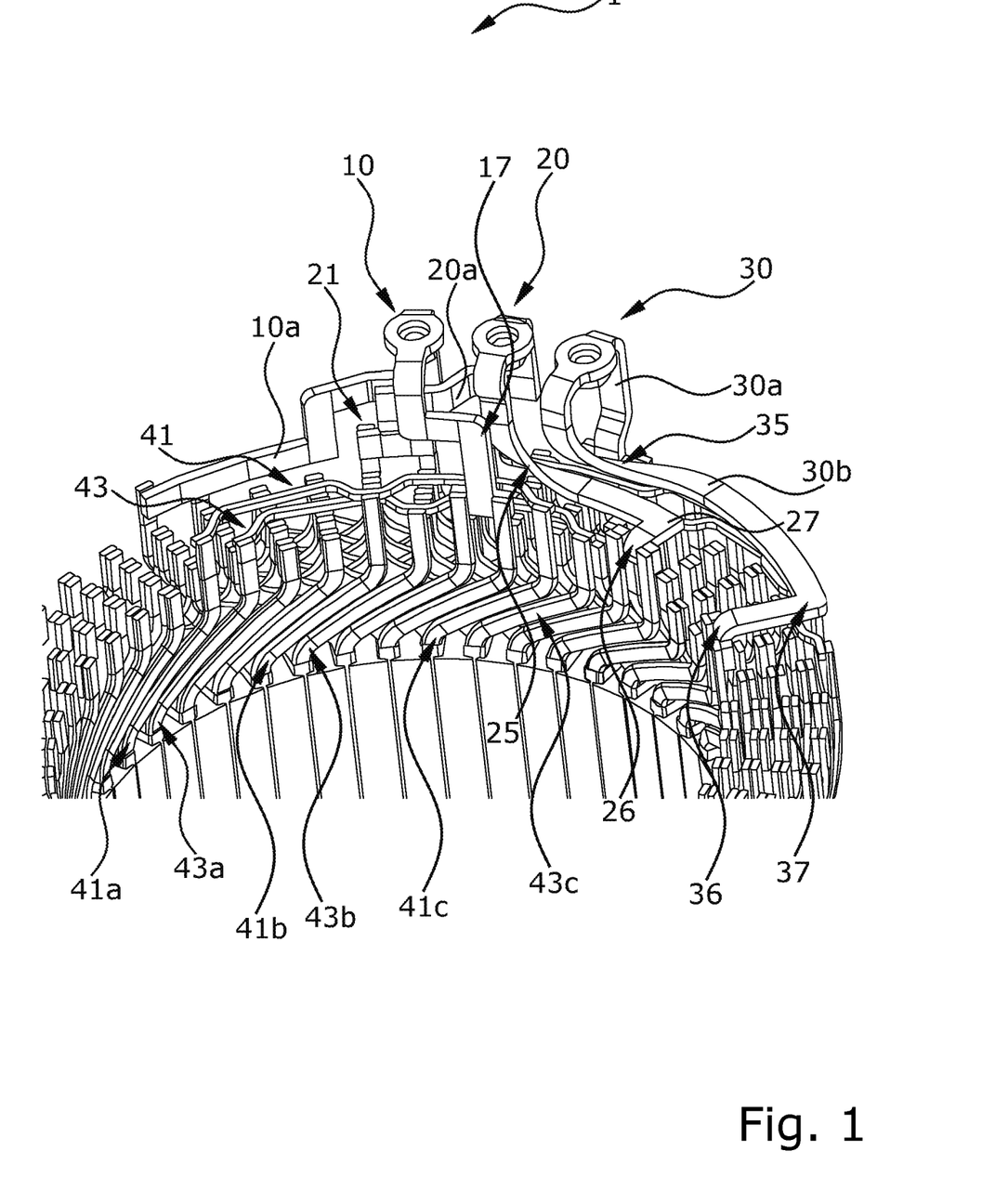
FIG. 1 shows a stator with interfaces for a connection of an inverter.

The stator 1 in FIG. 1 has a plurality of pins, which are connected to one another partially conductively and form coils around stator teeth. In the inner region of the stator there may be situated a rotor, and in the outer region of the stator there may be situated a housing, for example.

The stator 1 has three interfaces 10, 20, 30. Each interface has a leg 10a, 20a, 30a in the direction of the outer region of the stator and additionally one leg 10b, 20b, 30b in the direction of the inner region of the stator.

The stator inner-region leg 20b, 30b has an axial and radial twist 25, 35. The stator inner-region leg 20b, 30b also has, at an end facing the stator, a bend 26, 36 in the direction of the pins. The stator inner-region leg 10, 20b, 30b also has an elbow 17, 27, 37.

The star point connector 41 connects the pins 41a, 41b, 41c. The star point connector 43 arranged above connects the pins 43a, 43b, 43c. The star point connectors run in different planes, and therefore the pins contacting them may also have different lengths.

Figure 2:
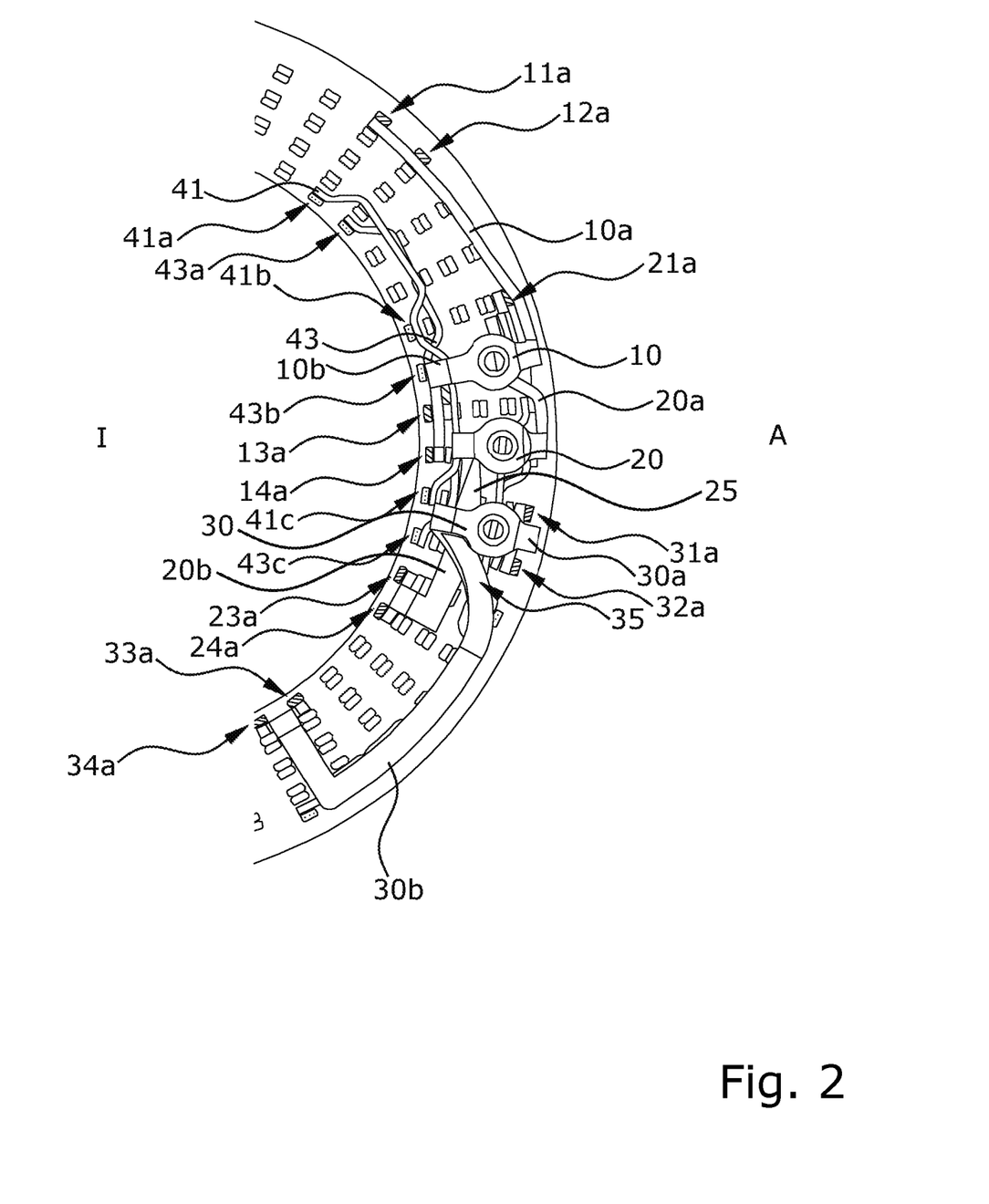
FIG. 2 shows a plan view of a stator with interfaces for a connection of an inverter.

In FIG. 2 the stator 1 is shown in a plan view with interfaces 10, 20, 30 and the star point connectors 41, 43 from FIG. 1. The stator interior I for a rotor and the stator exterior A for a housing can be seen. The three interfaces 10, 20, 30 form a defined connection point for an inverter.

The interface 10 is connected via a stator outer-region leg 10a to the pins 11a and 12a shown hatched. The interface 10 is furthermore connected via the stator inner-region leg 10b to the pins 13a and 14a shown hatched.

The stator outer-region pins 11a, 12a lie on a different concentric circle as compared to the two stator inner-region pins 13a, 14a.

The interface 20 likewise has a stator outer-region leg 20a, which is connected to the hatched pin 21a and a further pin (not shown), which lies below the interface 10. The stator inner-region leg 20b of the interface is connected to the pins 23a and 24a shown hatched.

The interface 30 likewise has a stator outer-region leg 30a, which is connected to the pins 31a and 32a shown hatched. The stator inner-region leg 30b of the interface 30 is connected to the pins 33a and 34a shown hatched.

The legs 20b, 30b of the interfaces 20, 30, which legs are situated in the inner region of the stator, each have a twist 25, 35. The twist is provided both radially to the stator centre point and axially along a rotor axis. The two legs 20b and 30b in the inner region of the stator also have a bend before the contact with the pins, which is shown more clearly in FIGS. 4 and 5.

Below the interfaces 10, 20, 30, the stator has what are known as star point connectors 41, 43 arranged in different planes. The coils formed by the connected pins thus have a star point.

The star point connector 41 connects the pins 41a, 41b, 41c. The star point connector 43 situated above connects the pins 43a, 43b, 43c. The star point connectors run in different planes, and therefore the pins contacting them may also have different lengths.

Figure 3:
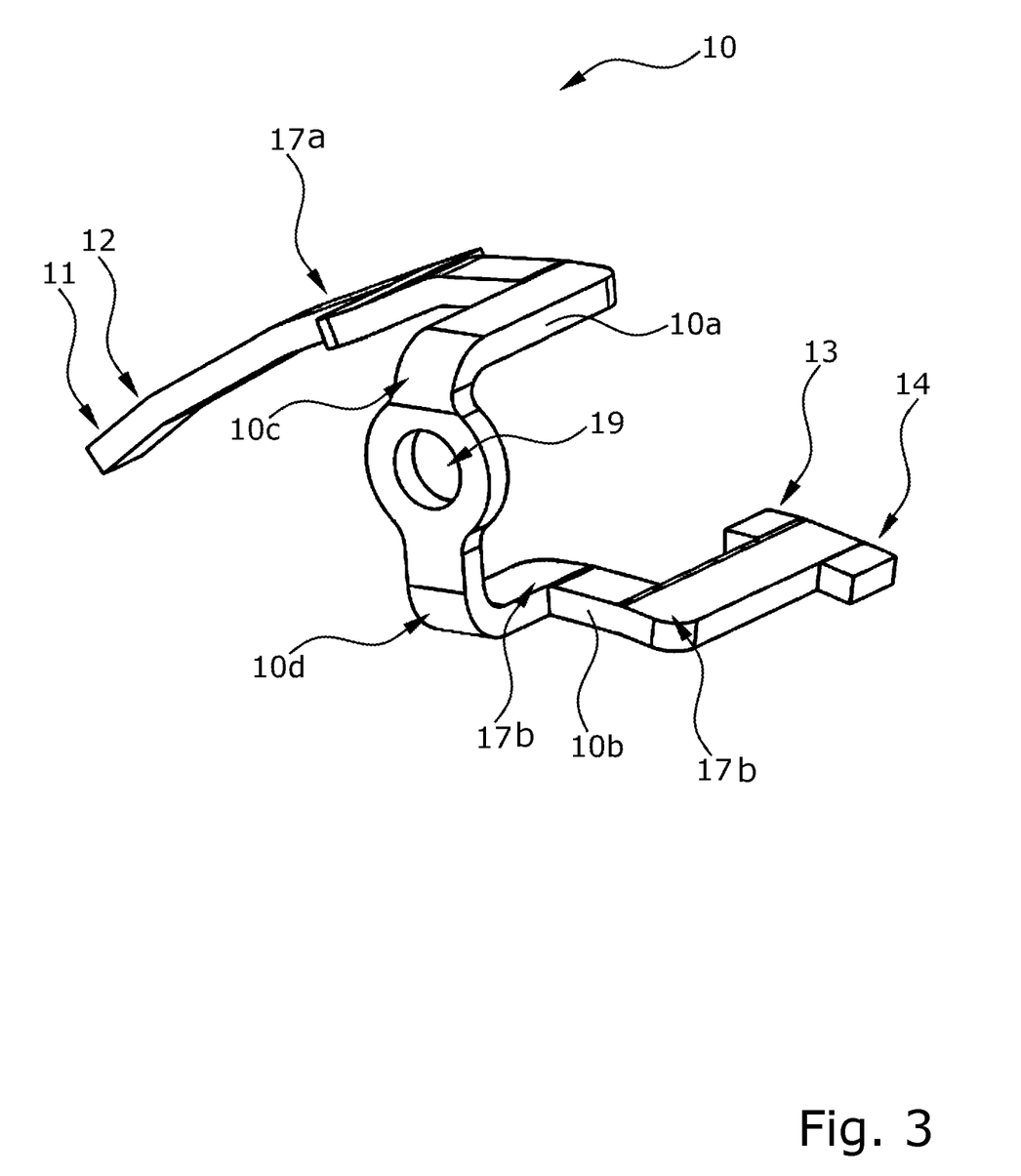
FIG. 3 shows an exemplary embodiment of an interface.

In FIG. 3 the interface 10 with the stator outer-region leg 10a and the stator inner-region leg 10b is shown. The stator outer-region leg 10a has an elbow 17a in the direction of the contact points 11, 12 for the pins. The stator inner-region leg 10b has two elbows 17b in the direction of the contact points 13, 14 for the pins. The two legs 10a, 10b may also have a deflection 10c, 10d in the direction of the contact face.

Figure 4:
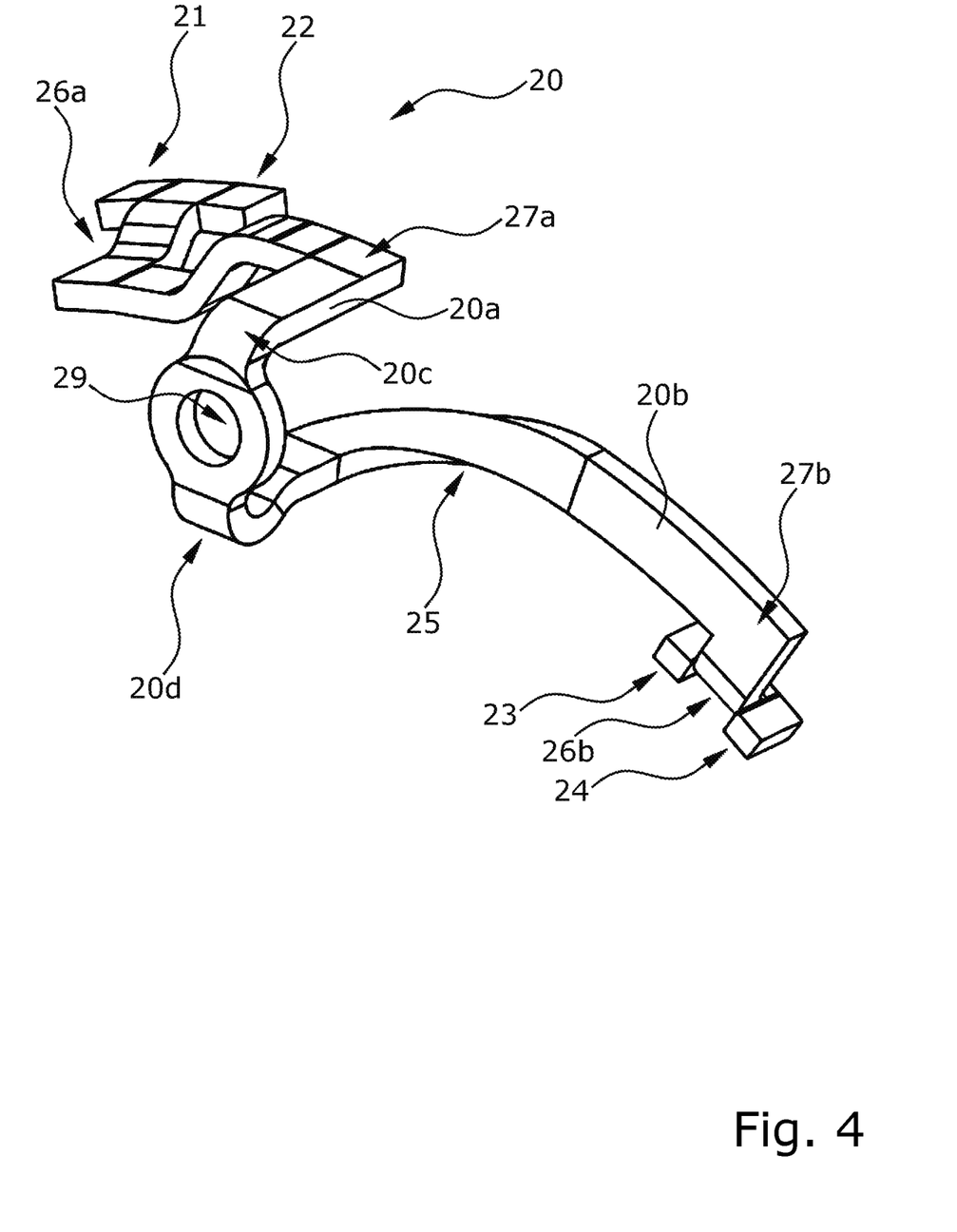
FIG. 4 shows a further exemplary embodiment of an interface.

In FIG. 4 the interface 20 with the stator outer-region leg 20a and the stator inner-region leg 20b is shown. The stator outer-region leg 20a has an elbow 27a in the direction of the contact points 21, 22 for the pins. Before the contact points, the stator outer-region leg 20a bends with a bend 26a.

The stator inner-region leg 20b has a twist 25 in the lateral and also axial direction in relation to the stator, and in addition the stator inner-region leg 20b has an elbow 27b in the direction of the contact points 23, 24 for the pins. Before the contact points, the stator inner-region leg 20b bends by a bend 26b. The two legs 20a, 20b may also have a deflection 20c, 20d in the direction of the contact face 29.

Figure 5:
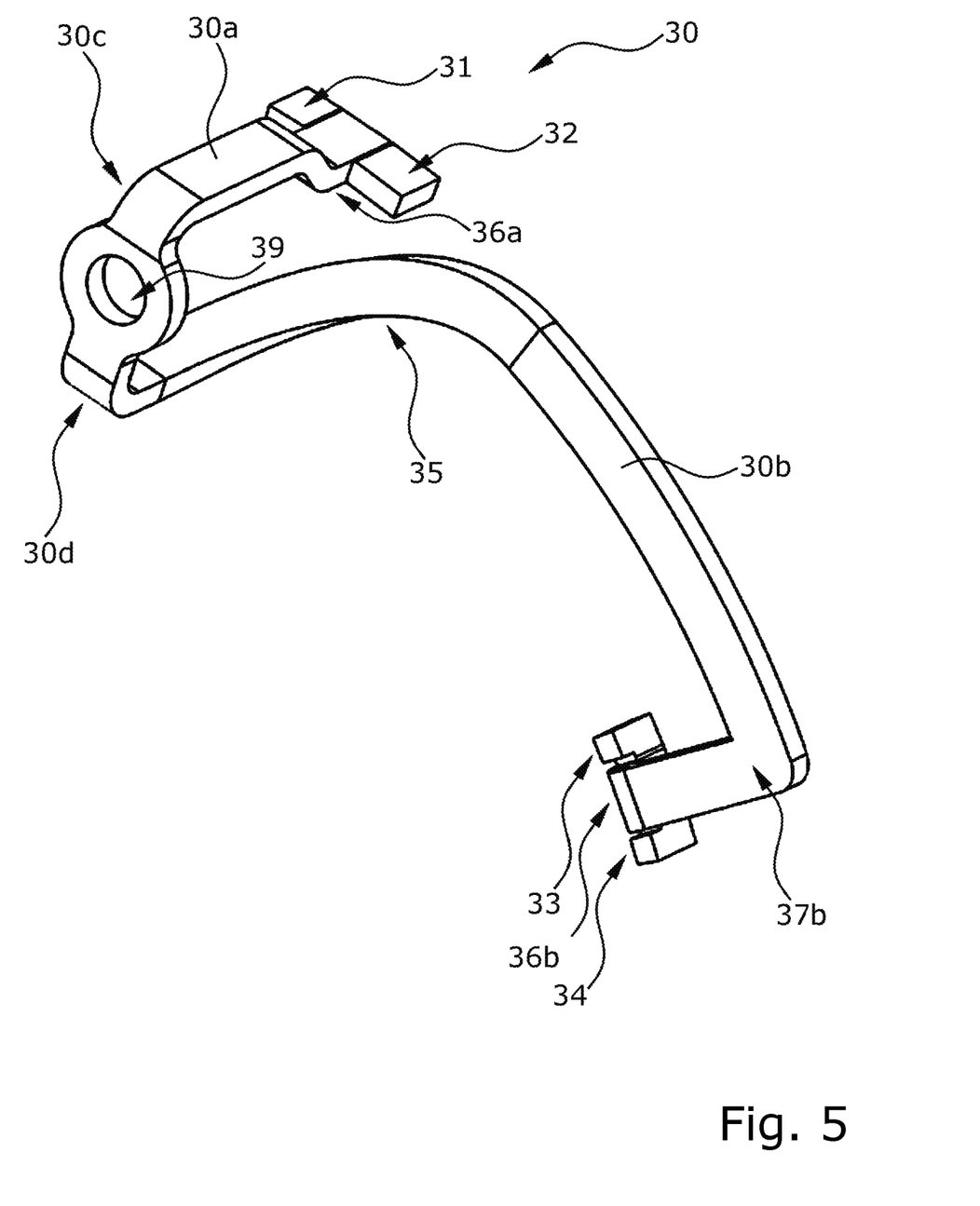
FIG. 5 shows yet a further exemplary embodiment of an interface.

In FIG. 5 the interface 20 with the stator outer-region leg 30a and the stator inner-region leg 30b is shown. The stator outer-region leg 30a connects the contact face 39 to the contact points 31, 32 for the pins of the stator. Before the contact points 31, 32 the stator outer-region leg 30a bends with a bend 36a.

The stator inner-region leg 30b has a twist 35 in the lateral and also axial direction in relation to the stator, and in addition the stator inner-region leg 20b has an elbow 37b in the direction of the contact points 33, 34 for the pins. Before the contact points 33, 34, the stator inner-region leg 30b bends by a bend 36b. The two legs 30a, 30b may also have a deflection 30c, 30d in the direction of the contact face 39.

Figure 6:
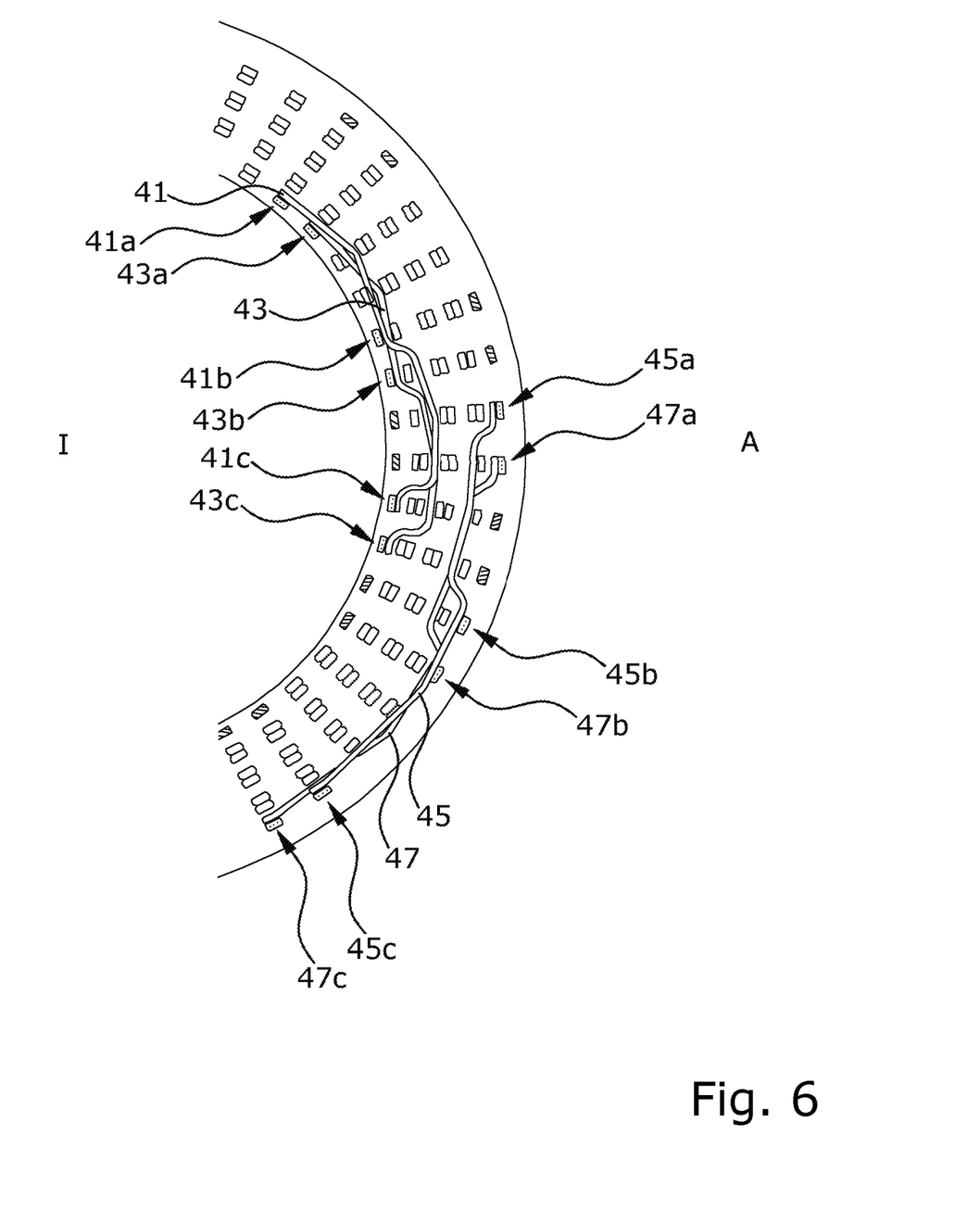
FIG. 6 shows a plan view of a stator with star point connectors.

FIG. 6 shows a plan view of the stator 1 without interfaces. The stator has a plurality of pins and four star point connectors 41, 43, 45, 47. Each star point connector is connected to three pins (reference signs of the star point connectors and a, b, c).

Figure 7:
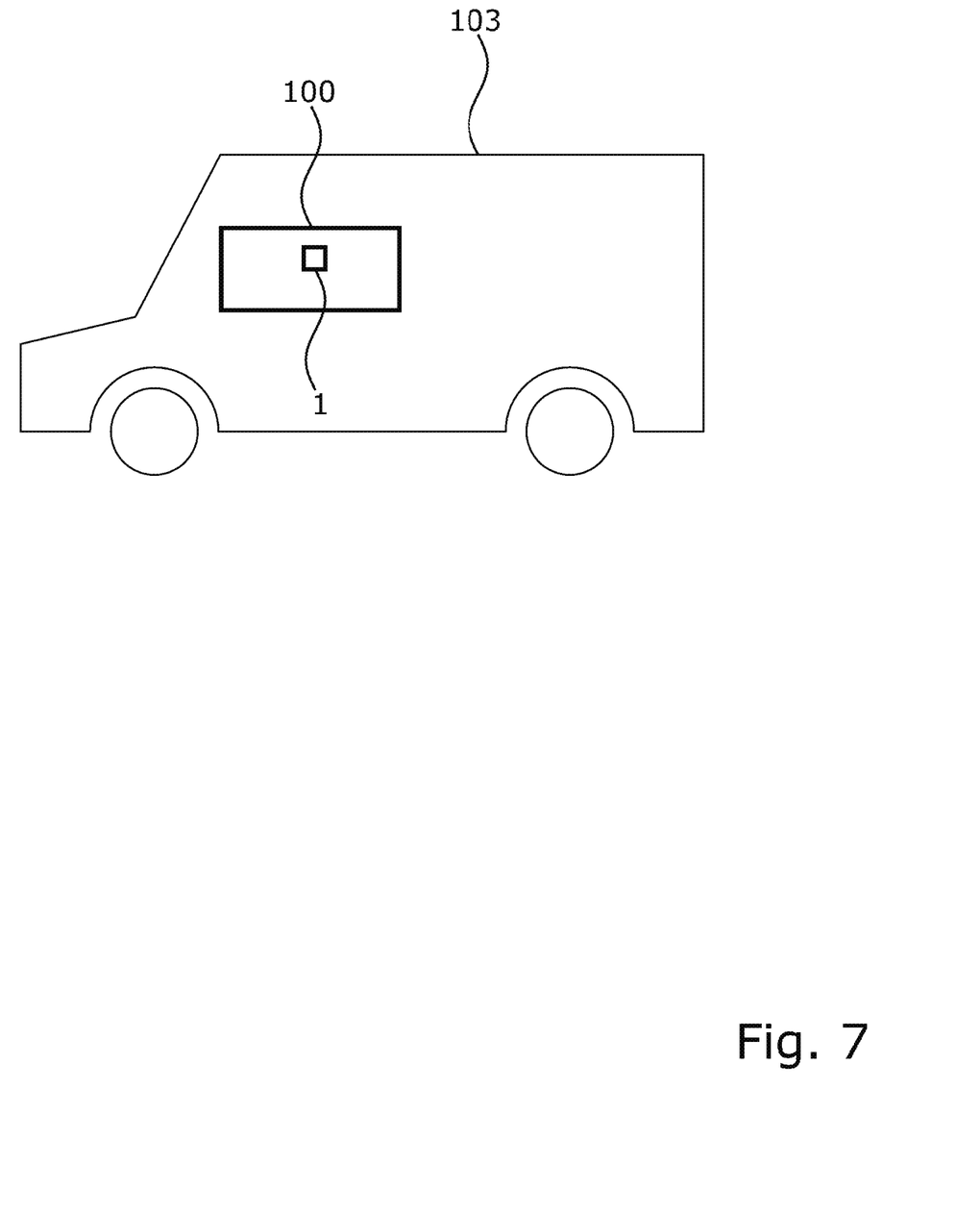
FIG. 7 shows a vehicle with an electrical machine, in particular an electric motor, with a stator with interface.

The pins differ in their length, wherein the three pins connected by a star point connector are of equal length. Each of the pins connected by a star point connector represents the end of a coil, and the star point connector thus forms a star point of three connected coils. The star point connectors may likewise be connected to one another, and therefore a plurality of star points may lie at the same electrical potential. FIG. 7 is a schematic diagram of an exemplary embodiment of a vehicle 103, for example a hybrid vehicle or an electric vehicle, comprising an electrical machine 100, in particular an electric motor, with an exemplary embodiment of the stator 1 for driving the vehicle 103.

The invention claimed is:

1. A stator for an electrical machine, comprising
a plurality of pins arranged on at least two concentric circles; and
a plurality of interfaces, each of the plurality of interfaces including a contact face, and two electrically conductive legs extending from the contact face and connected to the plurality of pins at ends remote from the contact face to support the contact face,
wherein the two electrically conductive legs are respectively connected to at least one of the plurality of pins on the at least two concentric circles different from one another,
each of the two electrically conductive legs is bent substantially by 90 degrees relative to the contact face,
at least one of the two electrically conductive legs in at least one of the plurality of interfaces has a twist portion between the contact face and an end remote from the contact face,
at least one of the two electrically conductive legs in each of the plurality of interfaces is connected to at least two of the plurality of pins at the end remote from the contact face, and
the at least one of the two electrically conductive legs in the at least one of the plurality of interfaces is bent between the twist portion and the end remote from the contact face at an angle of from 80 to 100 degrees.

2. The stator according to claim 1, wherein the twist portion is provided both axially and radially to the stator.

3. The stator according to claim 1, wherein each of the plurality of interfaces, at the contact face, has a recess for a contact pin or contact screw.

4. The stator according to claim 1, further comprising a conductor connecting the plurality of pins below the plurality of interfaces.

5. A vehicle comprising:
an electrical machine including a stator according to claim 1.

6. The stator according to claim 1, wherein the at least one of the two electrically conductive legs in the at least one of the plurality of interfaces is bent between the twist portion and the end remote from the interface at right angles.

7. A stator for an electrical machine, comprising:
a plurality of pins arranged on at least two concentric circles; and
a plurality of interfaces, each of the plurality of interfaces including a contact face, and two electrically conductive legs extending from the contact face and connected to the plurality of pins at ends remote from the contact face to support the contact face,
wherein the two electrically conductive legs are respectively connected to at least one of the plurality of pins on the at least two concentric circles different from one another,
each of the two electrically conductive legs is bent substantially by 90 degrees relative to the contact face,
at least one of the two electrically conductive legs in at least one of the plurality of interfaces has a twist portion between the contact face and an end remote from the contact face, and
the plurality of interfaces is arranged above the plurality of pins, and the two electrically conductive legs respectively extend downwardly from two sides of the contact face to be faced with each other.

8. A stator for an electrical machine, comprising:
a plurality of pins arranged on at least two concentric circles; and
a plurality of interfaces, each of the plurality of interfaces including a contact face, and two electrically conductive legs extending from the contact face and connected to the plurality of pins at ends remote from the contact face to support the contact face,
wherein the two electrically conductive legs are respectively connected to at least one of the plurality of pins on the at least two concentric circles different from one another,
each of the two electrically conductive legs is bent substantially by 90 degrees relative to the contact face,
at least one of the two electrically conductive legs in at least one of the plurality of interfaces has a twist portion between the contact face and an end remote from the contact face,
the plurality of interfaces includes a first interface, a second interface, and a third interface, and the two electrically conductive legs includes an inner leg and an outer leg,
the inner leg of the first interface includes two elbows bent in a circumferential direction of the at least two concentric circles, and the inner leg of each of the second interface and the third interface includes an elbow bent in a radial direction of the at least two concentric circles, and
the inner leg of each of the second interface and the third interface includes the twist portion between the contact face and the elbow.

* * * * *